(12) United States Patent
Chan et al.

(10) Patent No.: US 7,997,602 B2
(45) Date of Patent: Aug. 16, 2011

(54) RACK-MOUNTED STORAGE CASE FOR A MOTORCYCLE

(75) Inventors: Adam Chan, Wauwatosa, WI (US); Douglas D. Clarkson, Colgate, WI (US); Brian Weber, Cedar Rapids, IA (US); Chad Buchanan, Mequon, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 416 days.

(21) Appl. No.: 12/174,397

(22) Filed: Jul. 16, 2008

(65) Prior Publication Data
US 2010/0012416 A1    Jan. 21, 2010

(51) Int. Cl.
*B62J 7/00* (2006.01)

(52) U.S. Cl. ........ 280/202; 180/219; 224/412; 224/413; 224/417

(58) Field of Classification Search .................. 224/412, 224/413, 417, 430; 280/202; 180/219
See application file for complete search history.

(56) References Cited

U.S. PATENT DOCUMENTS

| | | | | |
|---|---|---|---|---|
| 3,301,448 A | * | 1/1967 | Inoue | 224/431 |
| 3,795,354 A | * | 3/1974 | Stippich | 224/418 |
| 4,003,508 A | * | 1/1977 | Hoops | 224/419 |
| 4,059,207 A | | 11/1977 | Jackson et al. | |
| 4,125,213 A | | 11/1978 | Watkins | |
| 4,266,703 A | | 5/1981 | Litz | |
| 4,303,184 A | | 12/1981 | Kloth | |
| 4,359,233 A | | 11/1982 | Jackson et al. | |
| 4,469,256 A | | 9/1984 | McEwen | |
| 4,501,384 A | * | 2/1985 | Itoh | 224/435 |
| D307,733 S | | 5/1990 | Kushitani | |
| 5,001,779 A | | 3/1991 | Eggert et al. | |
| 5,025,883 A | * | 6/1991 | Morinaka et al. | 180/219 |
| D348,041 S | | 6/1994 | Lovett | |
| 5,405,068 A | | 4/1995 | Lovett | |
| D360,182 S | | 7/1995 | Lovett | |
| D371,537 S | | 7/1996 | Jennings | |
| 5,579,971 A | * | 12/1996 | Chuang | 224/430 |
| 5,810,230 A | * | 9/1998 | Nutto | 224/417 |

(Continued)

OTHER PUBLICATIONS

Bykebitz Motorcycle Accessories Ltd GIVI—Soft Luggage, Givi T450 Trolley bag, downloaded from <<http://www.bykebitz.co.uk/acatalog/Givi_Soft_Luggage.html>> on Jul. 11, 2008, 4 pages.

*Primary Examiner* — Paul N Dickson
*Assistant Examiner* — Maurice Williams
(74) *Attorney, Agent, or Firm* — Michael Best & Friedrich LLP

(57) ABSTRACT

A motorcycle including a frame, an engine mounted to the frame, two wheels mounted for rotation to the frame with at least one of the wheels operably coupled to the engine, a rack coupled to the frame, and a storage case. The storage case including a body and a latch. The body defining a cavity and an opening that provides access to the cavity, and the body including a base that has a recess shaped to receive a portion of the rack. The latch is movably coupled to the base and is movable between an open position that provides access to the recess, and a closed position that inhibits access to the recess. The storage case is movable between an attached position where the portion of the rack is positioned within the recess and the latch is in the closed position, and a detached position where the latch is in the open position and the portion of the rack is positioned outside of the recess.

18 Claims, 10 Drawing Sheets

U.S. PATENT DOCUMENTS

| | | | |
|---|---|---|---|
| 6,029,875 A * | 2/2000 | Johnston | 224/417 |
| 6,123,239 A | 9/2000 | Lovitt | |
| 6,305,590 B1 | 10/2001 | Hayes | |
| 6,354,476 B1 | 3/2002 | Alderman | |
| 6,491,193 B2 | 12/2002 | Dudek et al. | |
| 6,499,638 B2 | 12/2002 | Campbell | |
| 6,533,152 B1 | 3/2003 | Dischler | |
| 6,547,114 B2 | 4/2003 | Smith | |
| 6,631,835 B2 * | 10/2003 | Fang | 224/413 |
| 6,817,501 B1 | 11/2004 | Rogers et al. | |
| 6,974,059 B2 | 12/2005 | Alderman | |
| 7,077,302 B2 * | 7/2006 | Chuang | 224/420 |
| 7,243,750 B2 * | 7/2007 | Nakabayashi et al. | 180/68.1 |
| 7,556,114 B2 * | 7/2009 | Hanagan | 180/219 |
| 2004/0011840 A1 * | 1/2004 | Lovett | 224/584 |
| 2007/0164068 A1 * | 7/2007 | Godshaw et al. | 224/430 |
| 2008/0041901 A1 * | 2/2008 | Chuang | 224/430 |
| 2008/0073396 A1 * | 3/2008 | Chiang et al. | 224/413 |
| 2008/0203126 A1 * | 8/2008 | Campbell | 224/413 |

* cited by examiner

US 7,997,602 B2

RACK-MOUNTED STORAGE CASE FOR A MOTORCYCLE

BACKGROUND

The present invention relates to baggage that is attachable to a motorcycle. Motorcyclists often attach baggage to their motorcycles to provide more storage space. Typically, motorcyclists employ saddlebags and trunks to add storage space to their motorcycles.

SUMMARY

In one embodiment, the invention provides a motorcycle that includes a frame, an engine mounted to the frame, two wheels mounted for rotation to the frame with at least one of the wheels operably coupled to the engine, a rack coupled to the frame, and a storage case. The storage case includes a body and a latch. The body defines a cavity and an opening that provides access to the cavity, and the body includes a base that has a recess shaped to receive a portion of the rack. The latch is movably coupled to the base and is movable between an open position that provides access to the recess, and a closed position that inhibits access to the recess. The storage case is movable between an attached position where the portion of the rack is positioned within the recess and the latch is in the closed position, and a detached position where the latch is in the open position and the portion of the rack is positioned outside of the recess.

In another embodiment, the invention provides a storage case that is configured for coupling to a rack mounted on a motorcycle. The storage case includes a body and a latch. The body defines a cavity and an opening that provides access to the cavity, and includes a base that has a recess that is configured to receive a portion of the rack. The latch is movably coupled to the base and is movable between an open position that provides access to the recess, and a closed position that inhibits access to the recess. The storage case is movable between an attached position where the latch is in the closed position and configured to maintain the portion of the rack within the recess, and a detached position wherein the latch is in the open position and configured to allow the removal of the storage case from the rack.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
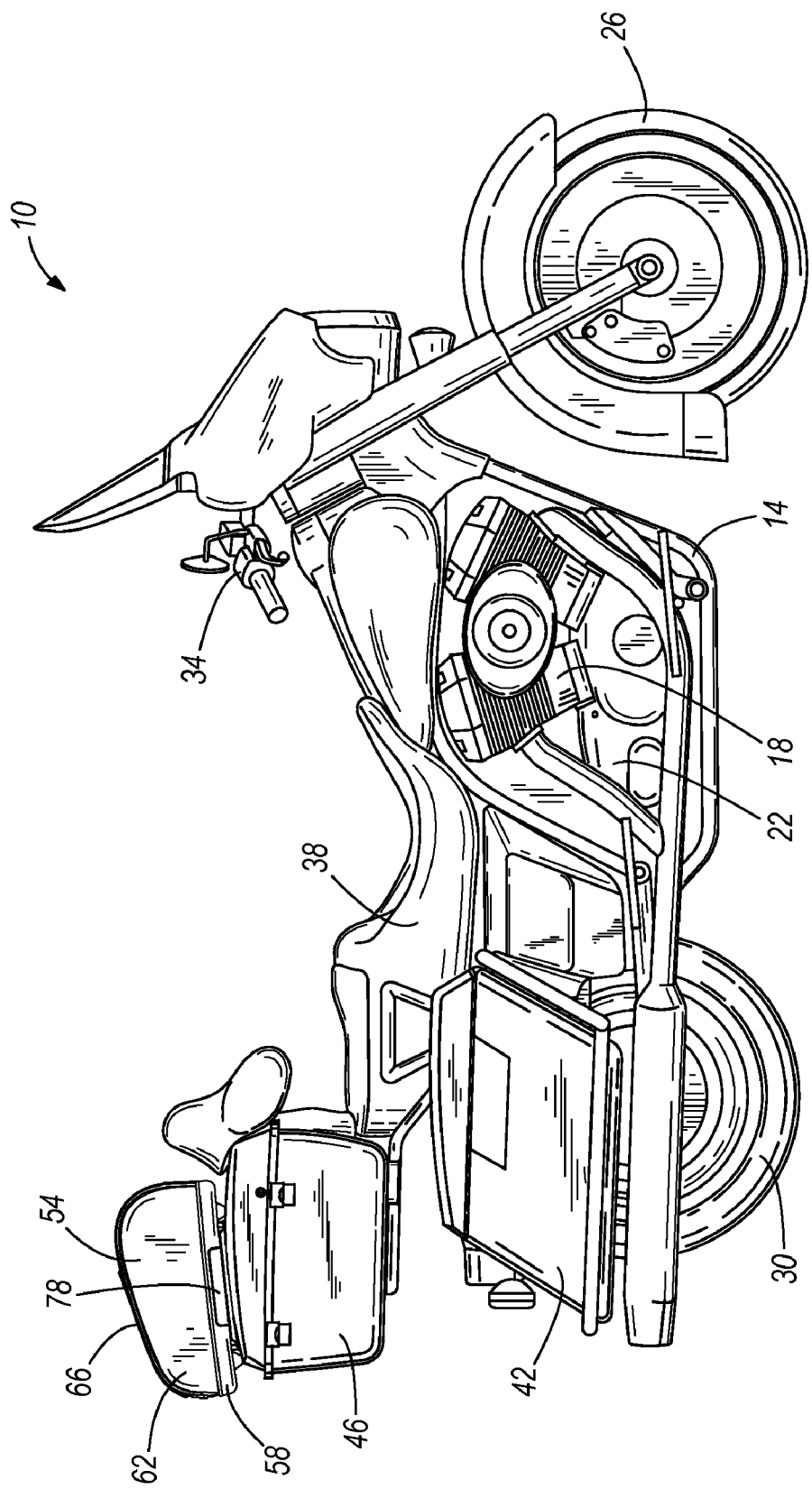
FIG. 1 is a side view of a motorcycle including a storage case according to one embodiment of the present invention, illustrating the storage case in an attached position.

FIG. 1 shows a motorcycle 10 that includes a frame 14 that supports an engine 18, a drive-train 22, a front wheel 26, a rear wheel 30, a handlebar assembly 34, and a seat 38. The engine 18 is mounted to the frame 14 and the drive-train 22 connects the engine 18 to the rear wheel 30 such that the engine 18 powers the rotation of the rear wheel 30. The motorcycle 10 also includes hard saddlebags 42 and a center-mounted luggage compartment in the form of a trunk 46 mounted to the frame 14. The trunk 46 includes a rack 50 (see FIGS. 7 and 13). A storage component in the form of a storage case 54 is removably coupled to the rack 50 and movable between an attached position (see FIG. 1) and a detached position (see FIG. 4). In some embodiments, the rack 50 may be coupled to the saddlebags 42, the seat 38, or another component of the motorcycle 10.

Figure 2:
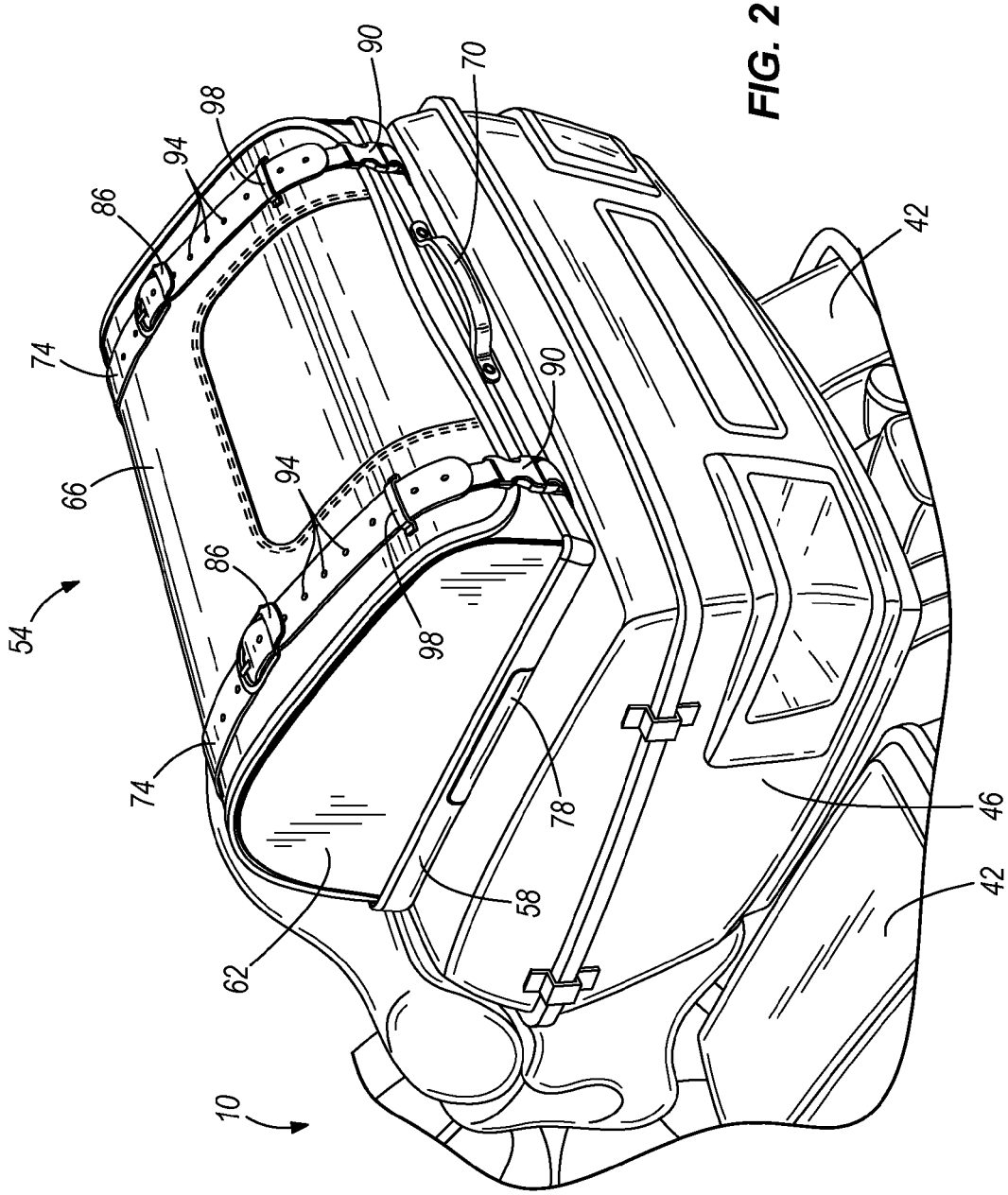
FIG. 2 is a perspective view of a rear portion of the motorcycle of FIG. 1.
Figure 5:
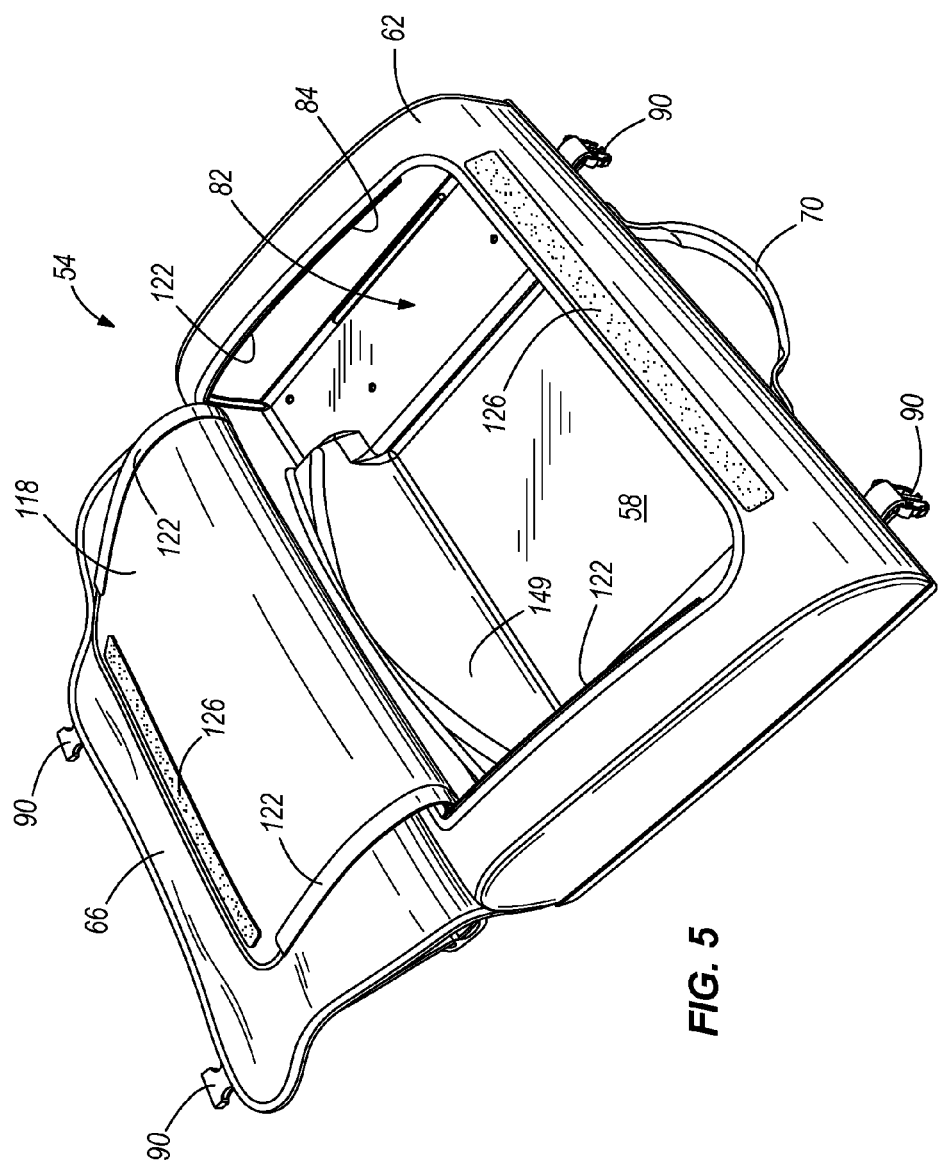
FIG. 5 is a top perspective view of the storage case of FIG. 1 illustrating the flap opened.

Turning now to FIG. 2, the storage case 54 includes a body 62 with a base 58, a cover 66, a handle 70, two adjustable straps 74, and two latches 78 that will be discussed in detail with respect to FIGS. 6-11. The base 58 is formed from a substantially rigid plastic and provides a removable connection to the rack 50. The body 62 defines a cavity 82 (see FIG. 5) for the storage of items, and an opening 84 that provides access to the cavity 82. The illustrated body 62 is constructed from a synthetic material that is similar to leather. In other embodiments, the base 58 and/or body 62 may be constructed from different materials (e.g., metal, leather, carbon fiber, nylon, P.V.C., etc.). In addition, the base 58 and the body 62 may be formed as a single piece or be formed separately and assembled together.

The cover 66 selectively allows access to the cavity 82 and is movable between a first or closed position (see in FIG. 2) where the cover 66 inhibits access to the cavity 82 through the opening 84 and a second or open position (see FIG. 4) where the cover 66 allows access to the cavity 82 through the opening 84. The illustrated cover 66 is constructed of the same material as the body 62 and includes a rigid plastic piece (e.g., polypropylene) that maintains the cover 66 substantially rigid. In other embodiments, the cover 66 may be constructed of different materials, or may have different laminations or layers. A logo or other advertisement (not shown) may be placed on the cover 66. For example, a patch with the manufacturer's logo or name may be sewn to the top surface of the cover 66 for decorative or other purposes, as desired.

Each adjustable strap 74 has a buckle 86 and a clip 90 that is attached to the storage case 54. A plurality of holes 94 are punched into each adjustable strap 74, and the buckles 86 adjust the length of the adjustable straps 74 by engaging the holes 94. The clips 90 are movable between a connected position (see FIG. 2) and a disconnected position (see FIG. 4), such that a user may move the cover 66 between the closed and open positions. In addition, the cover 66 includes two loops 98 that the adjustable straps 74 pass through such that the position of the ends of the adjustable straps 74 are held adjacent the body 62 when the clips 90 are in the connected position.

Figure 3:
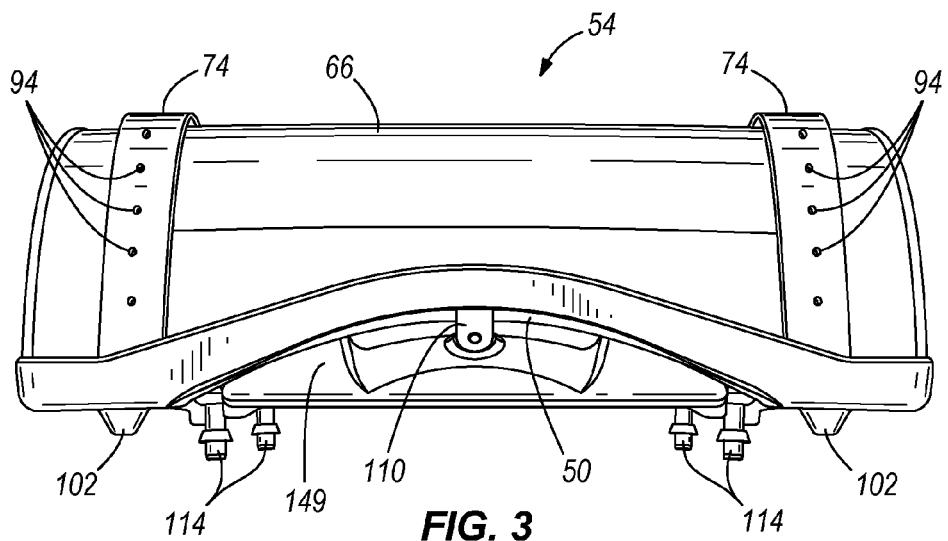
FIG. 3 is a front view of the storage case of FIG. 1 mounted on a rack in an attached position.

FIG. 3 shows the storage case 54 mounted to the rack 50 with the rack 50 removed from the trunk 46 of the motorcycle 10. The base 58 of the case 54 includes four resilient feet 102 (FIGS. 3 and 7), and the rack 50 has four posts 114 that connect the rack 50 to the trunk 46.

Figure 4:
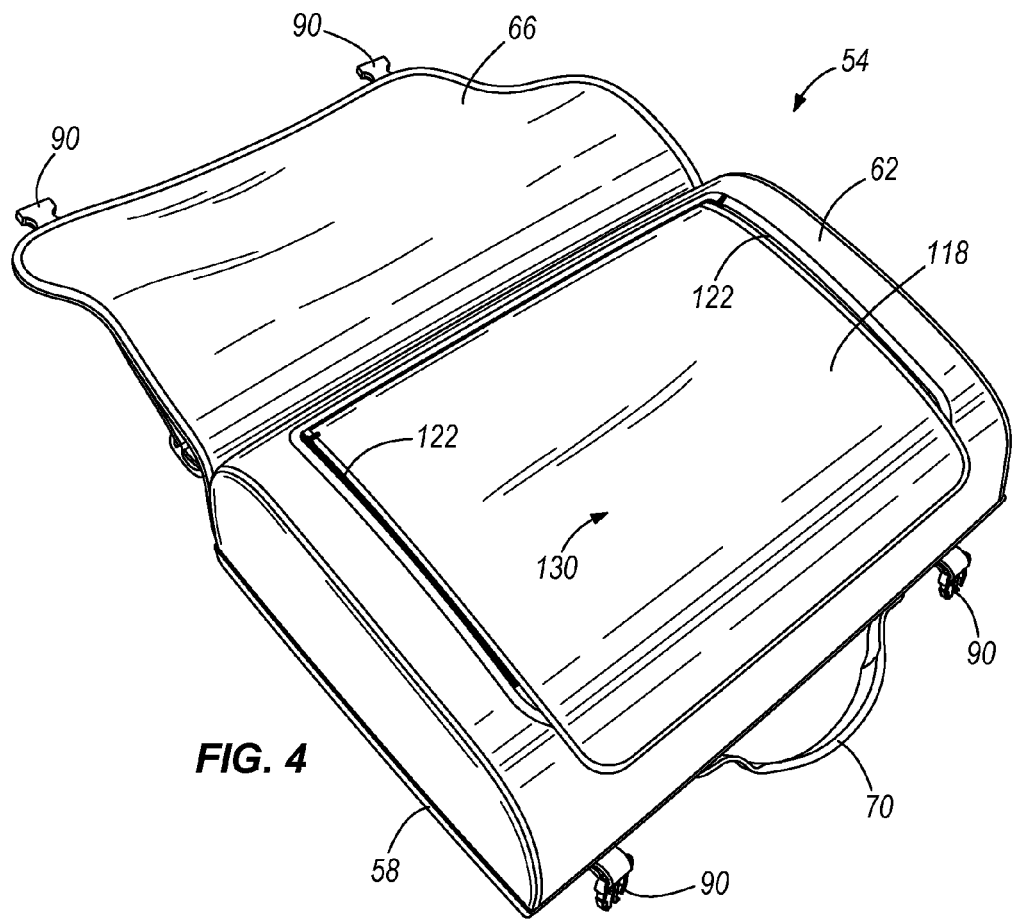
FIG. 4 is a top perspective view of the storage case of FIG. 1 illustrating a cover opened and a flap closed.

FIG. 4 shows the clips 90 in the disconnected position and the cover 66 in the open position such that a flap 118 is exposed. The flap 118 is positioned between the cavity 82 (see FIG. 5) and the cover 66 and attached to the opening 84 (see FIG. 5) such that the flap 118 selectively covers the opening 84 and selectively allows access to the cavity 82. The flap 118 includes two zippers 122 that selectively allow the flap 118 to be moved between a first or closed position (see FIG. 4) where access to the cavity 82 is inhibited, and a second or open position (see FIG. 5) where access to the cavity 82 is allowed. The flap 118 also has a hook and loop fastener 126 (see FIG. 5) on the front edge that inhibits the movement of the flap 118 from the closed to the open position. The flap 118 provides a storage space 130 above the cavity 82 and between the cover 66 and the flap 118 while the cover 66 is in the closed position and the flap 118 is in the closed position (see FIG. 4). For example, a sleeping roll may be placed in the storage space 130 between the flap 118 and the cover 66, and the adjustable straps 74 can be tightened such that the sleeping roll is held within the storage space 130. In addition, the sleeping roll or another object may be stored between the adjustable straps 74 and the cover 66. The flap 118 is constructed of the same material as the cover 66, although in other embodiments, different materials may be used.

Figure 6:
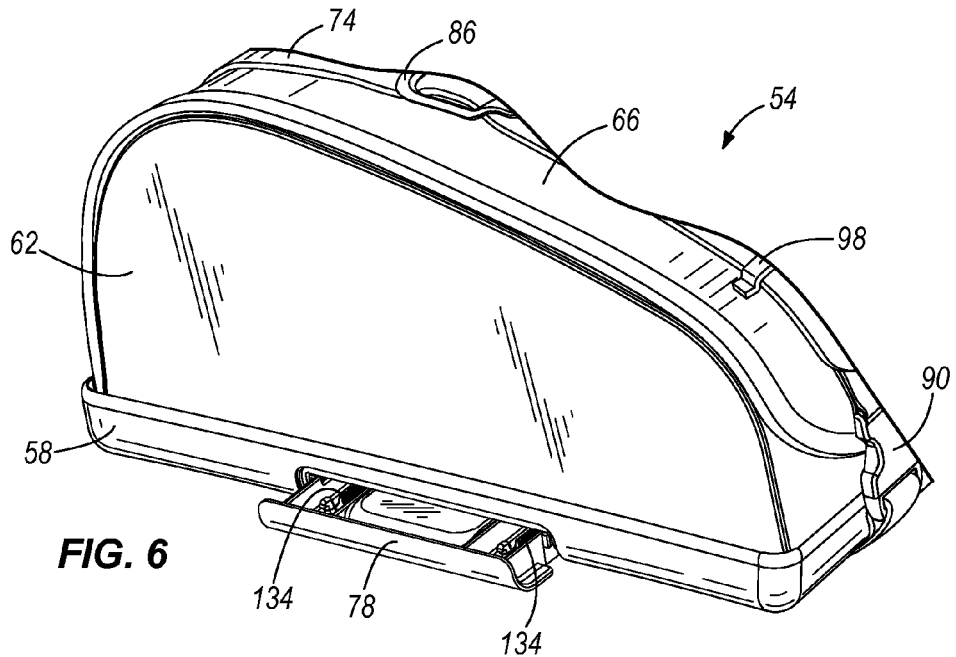
FIG. 6 is a perspective view of a portion of the storage case of FIG. 1 illustrating a latch in an open position.
Figure 8:
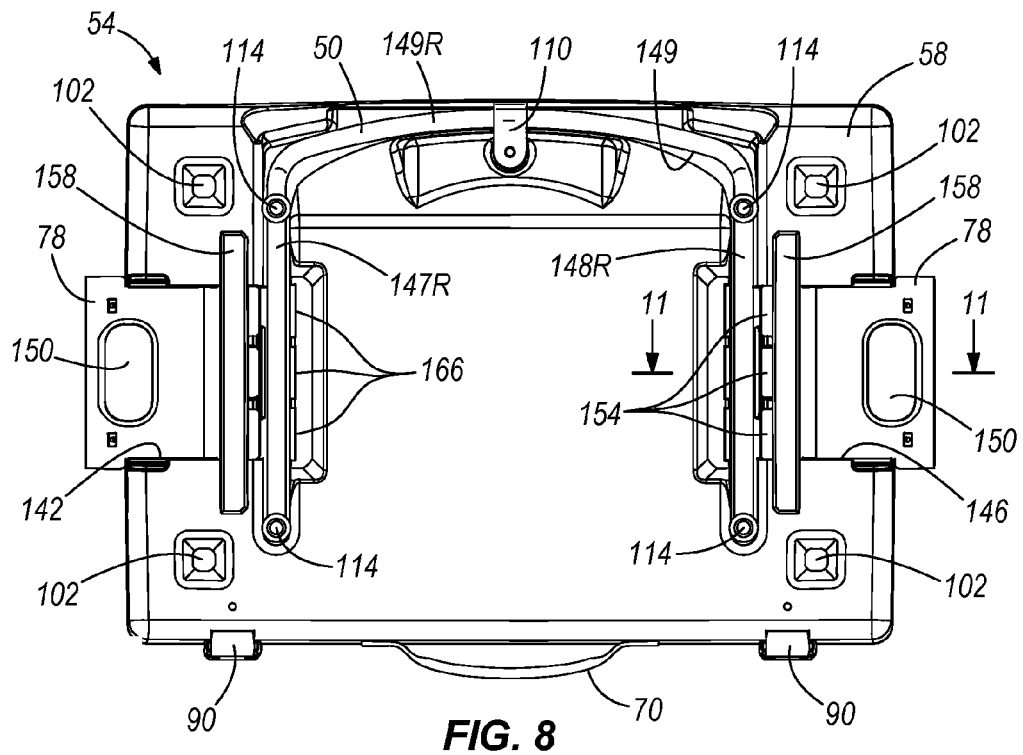
FIG. 8 is a bottom view of the storage case of FIG. 1 illustrating the latches in the open positions.
Figure 9:
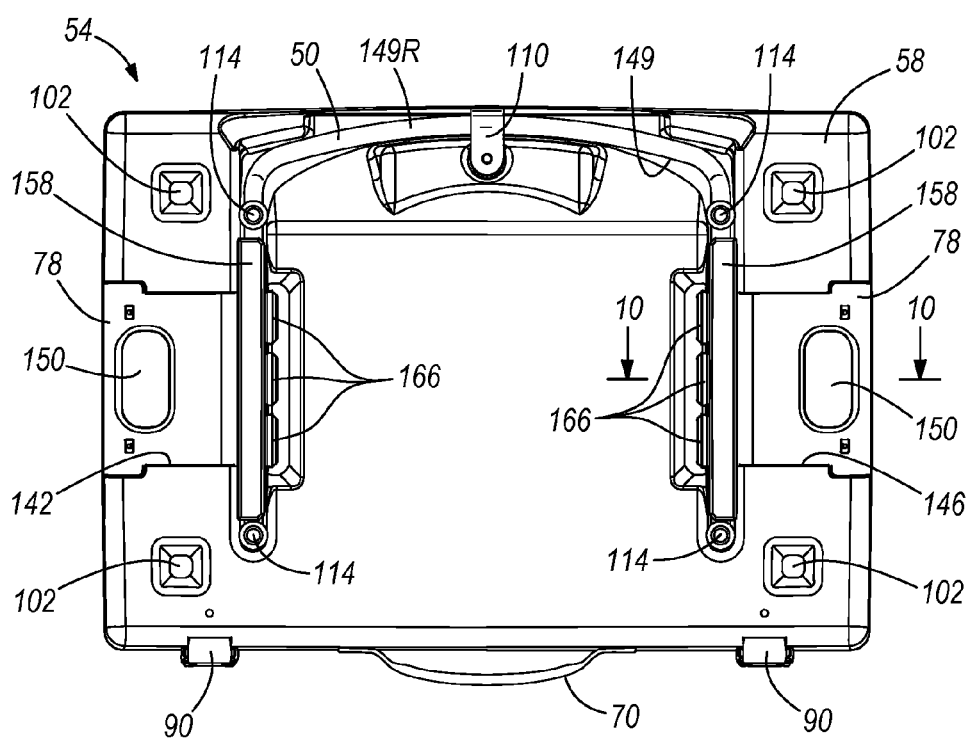
FIG. 9 is a bottom view of the storage case of FIG. 1 illustrating the latches in the closed positions.

Turning to FIG. 6, the latches 78 are slidably engaged with the base 58 between an open position (see FIGS. 6-8) and a closed position (see FIG. 9). Each latch 78 includes two springs 134 (see FIGS. 6 and 12) that bias the latch 78 toward the closed position. The outer surface of the latch 78 is contoured to match the base 58 such that, when the latch 78 is in the closed position, the outer surface of the latch 78 is flush with the outer surface of the base 58.

Figure 7:
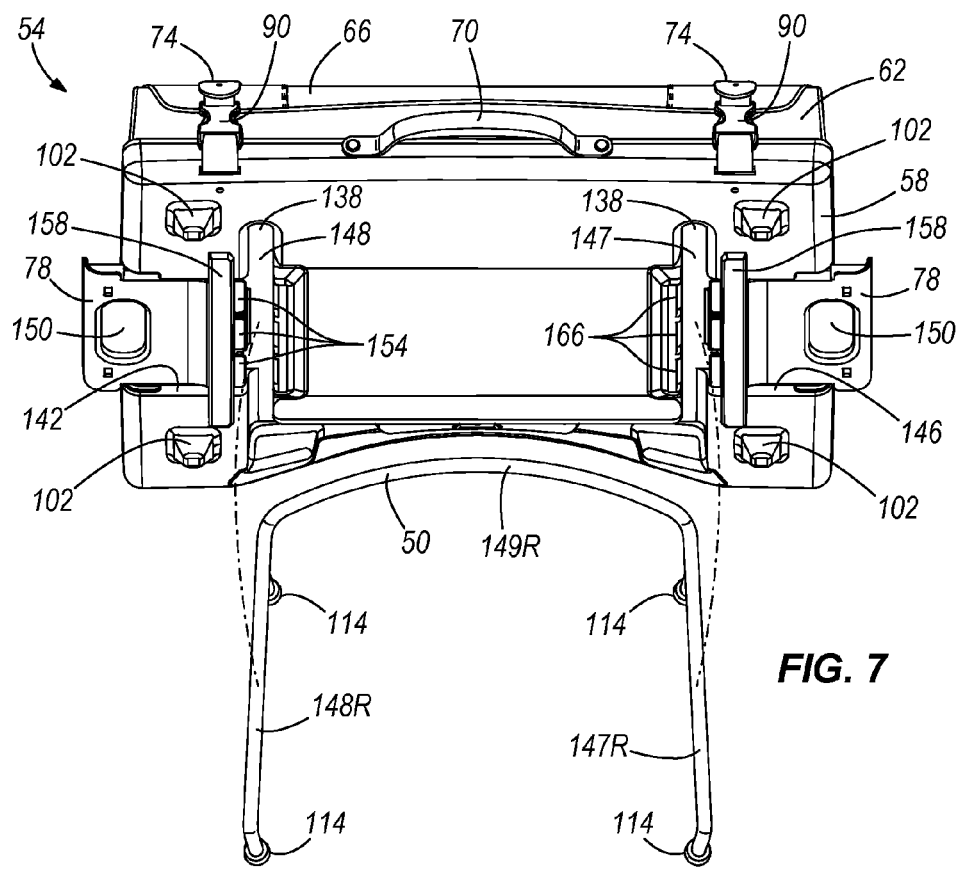
FIG. 7 is a perspective view of the storage case of FIG. 1 illustrating the storage case in a detached position.

FIG. 7 shows the storage case 54 removed from the rack 50 with both latches 78 in the open position. As can be seen, the base 58 includes a rack recess 138 sized to receive the rack 50. The base 58 also includes a first latch recess 142 and a second latch recess 146. The first and second latch recesses 142, 146 are sized to slidingly receive the latches 78. The latches 78 are at least partially received within the latch recesses 142, 146 while in both the closed position and the open position. While the storage case 54 is in the attached position, the rack 50 is disposed within the rack recess 138, and while the storage case 54 is in the detached position, the rack 50 is not disposed within the rack recess 138.

With reference to FIGS. 8 and 9, the rack recess 138 includes a first portion 147 (left portion of the recess 138 as viewed in FIGS. 8 and 9) shaped to receive a corresponding first portion 147R of the rack 50 and a second portion 148 (right portion of the recess 138 as viewed in FIGS. 8 and 9) shaped to receive a corresponding second portion 148R of the rack 50. The rack recess 138 also includes a forward portion 149 (top portion of the recess 138 as viewed in FIGS. 8 and 9) and the rack 50 includes a corresponding third portion 149R connecting the first and second portions 147R, 148R of the rack 50. The third portion 149R of the rack 50 is positioned adjacent the forward portion 149 of the rack recess 138 when the storage case 54 is in the attached position, and the forward portion 149 of the recess 138 is separated from the third portion 149R when the storage case 54 is in the detached position. The first and second portions 147, 148 of the rack recess 138 are mirror images of each other, and the corresponding first and second portions 147R, 148R of the rack 50 are mirror images of each other. The first, second, and third portions 147R, 148R, 149R of the rack 50 define a U-shape. In other embodiments, the first and second portions 147, 148 of the rack recess 138 may not be mirror images. In addition, the first and second portions 147R, 148R of the rack 50 may not be mirror images and the rack 50 may not form a U-shape.

A securing element in the form of a snap strap 110 engages the forward portion 149R the rack 50 and secures the rack 50 to the base 58 to inhibit the storage case 54 from moving from the attached position to the detached position.

The latches 78 include hand grips 150 that may be grasped by a user when moving the latch 78 between the closed position and the open position. Referring to FIGS. 7-11, the latches 78 also include projections 154 that engage the base 58 when the latches 78 are in the closed position such that the latches 78 are coupled to the base 58 on opposite sides of the rack recess 138, and arms 158 that extend along the rack recess 138 to maintain the rack 50 within the rack recess 138 while the latches 78 are in the closed position. When the latches 78 are in the closed position (see FIG. 9), the arms 158 extend substantially between the posts 114 of the rack 50 such that the storage case 54 is secured to the rack 50 and the position of the storage case 54 with respect to the rack 50 is maintained. In some embodiments, the arms 158 inhibits fore-aft and/or side-to-side movement.

Figure 10:
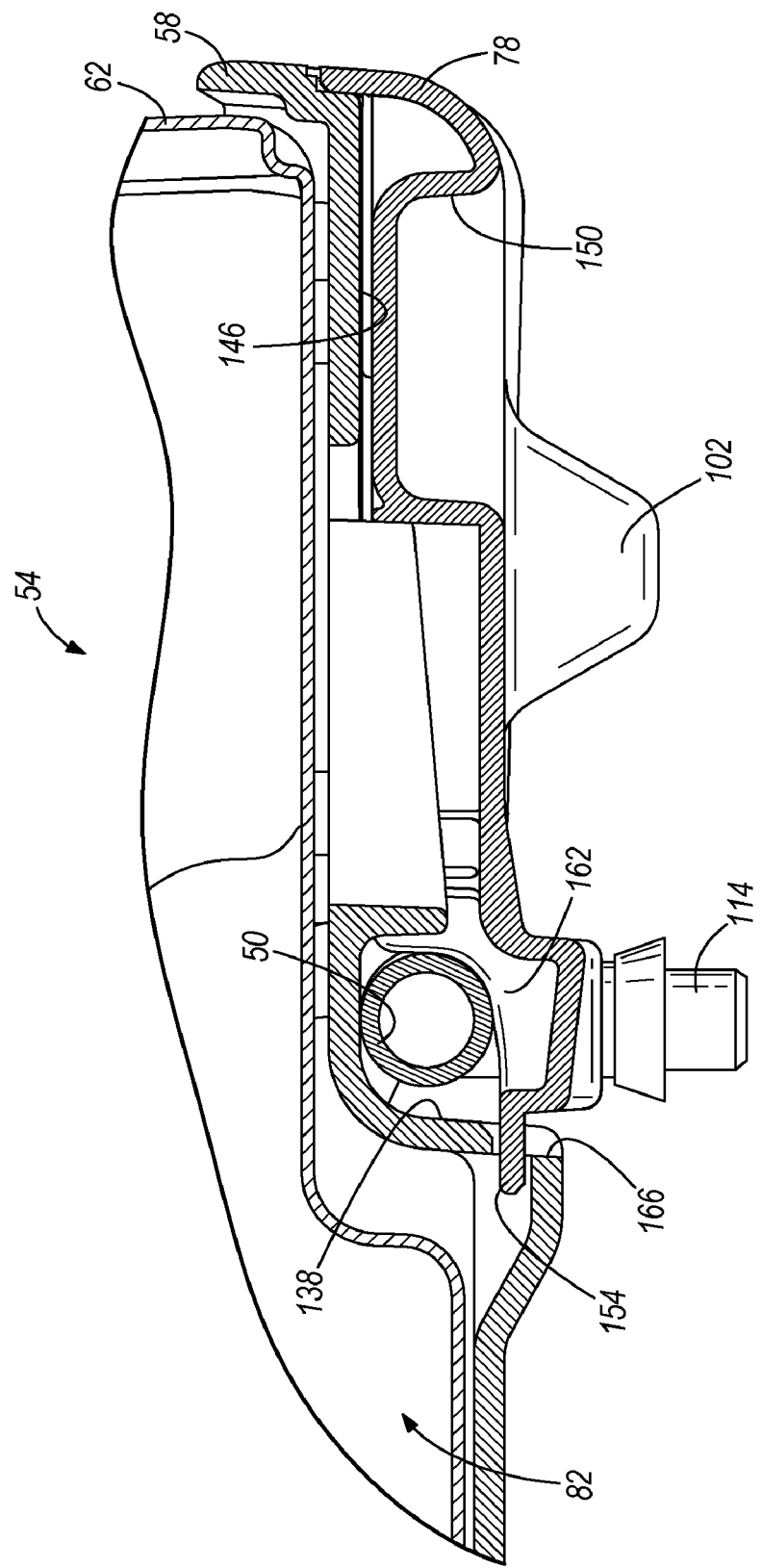
FIG. 10 is a section view of the storage case taken along line 10-10 in FIG. 9.

FIG. 10 shows the latch 78 in the closed position and engaging the rack 50. The latch 78 includes a contoured portion 162 that engages the rack 50 such that the rack 50 is maintained within the rack recess 138 while the storage case 54 is in the attached position. The base 58 includes ledges 166 that receive the projections 154 while the latch 78 is in the closed position the thereby couple the latch 78 to the base 58 on opposite sides of the rack recess 138.

Figure 11:
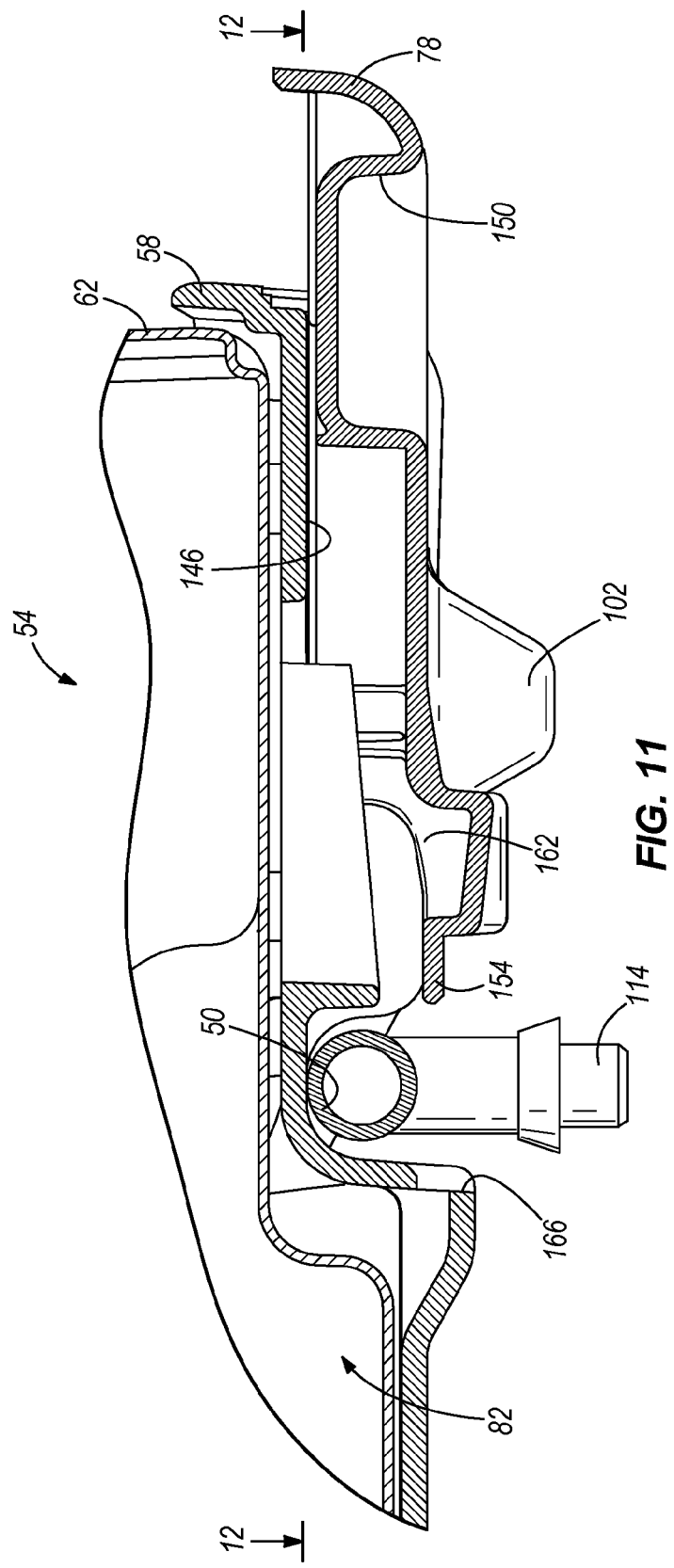
FIG. 11 is a section view of the storage case taken along the line 11-11 in FIG. 8.

FIG. 11 shows the latch 78 in the open position wherein access to the rack recess 138 is allowed such that the rack 50 may be removed from the rack recess 138 and the storage case 54 moved to the detached position. In the illustrated embodiment, the latch 78 includes a brightly colored decal (not shown) that indicates to a user that the latch 78 is in the open position. Such a decal may inhibit false seating of the storage case 54 on the rack 50 by alerting the user that the storage case 54 is not properly seated.

Figure 12:
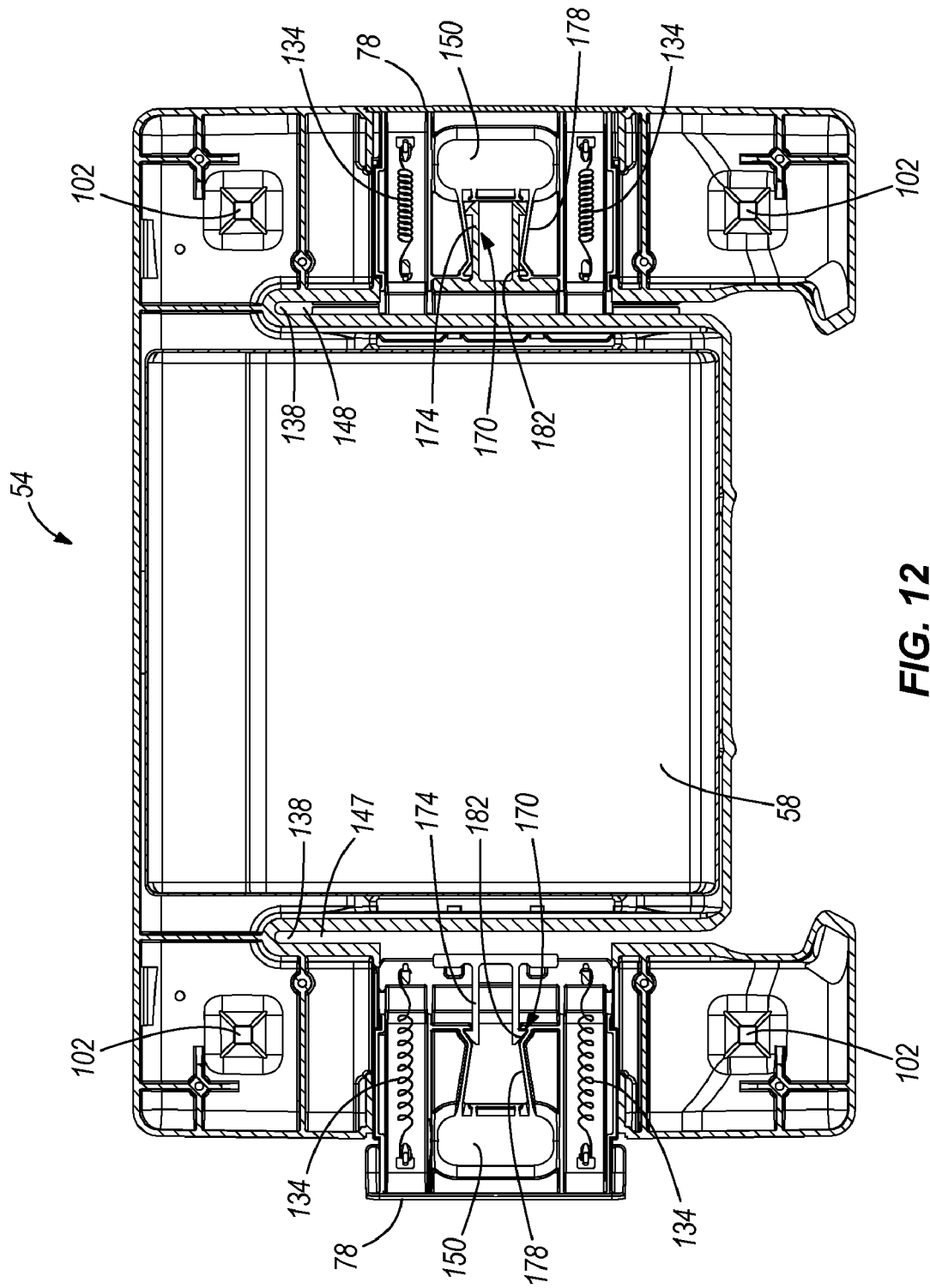
FIG. 12 is a section view of the storage case taken along the line 12-12 in FIG. 11.

FIG. 12 shows the first latch 78 in the open position and the second latch 78 in the closed position. The storage case 54 includes a retainer 170 associated with each latch 78. Each retainer 170 includes detent arms 174 formed in the base 58 and detent housings 178 formed in the latches 78. While the latch 78 is in the open position (left latch in FIG. 12), the detent arms 174 are disposed within a detent recess 182 of the detent housing 178 such that the latch 78 may not be moved further outside of the storage case 54 and the latch 78 is inhibited from returning to the closed position via the bias of the springs 134. While the latch 78 is in the closed position (right latch in FIG. 12), the detent arms 174 are disposed within the detent housing 178 and the springs 134 bias the latch 78 toward the closed position such that the latch 78 is inhibited from moving to the open position. A user may overcome the spring 134 bias and the bias of the detent arms 174 to move the latch 78 between the closed position and the open position. In other embodiments, a different retainer arrangement may be used. For example, a ball and socket detent or an over center linkage could be used, as desired. In another embodiment, further locking mechanisms (not shown) may be used such as a pad lock between the body 62 and the latch 78 to inhibit the latch 78 from moving from the closed position to the open position. In addition, the locking mechanism may include a latch and bolt type mechanism, a CAM lock, a mechanical lock involving arc type geometries to latch onto the rack 50, rack and pinion style connections involving multiple mechanical motions, or other mechanisms, as desired.

Figure 13:
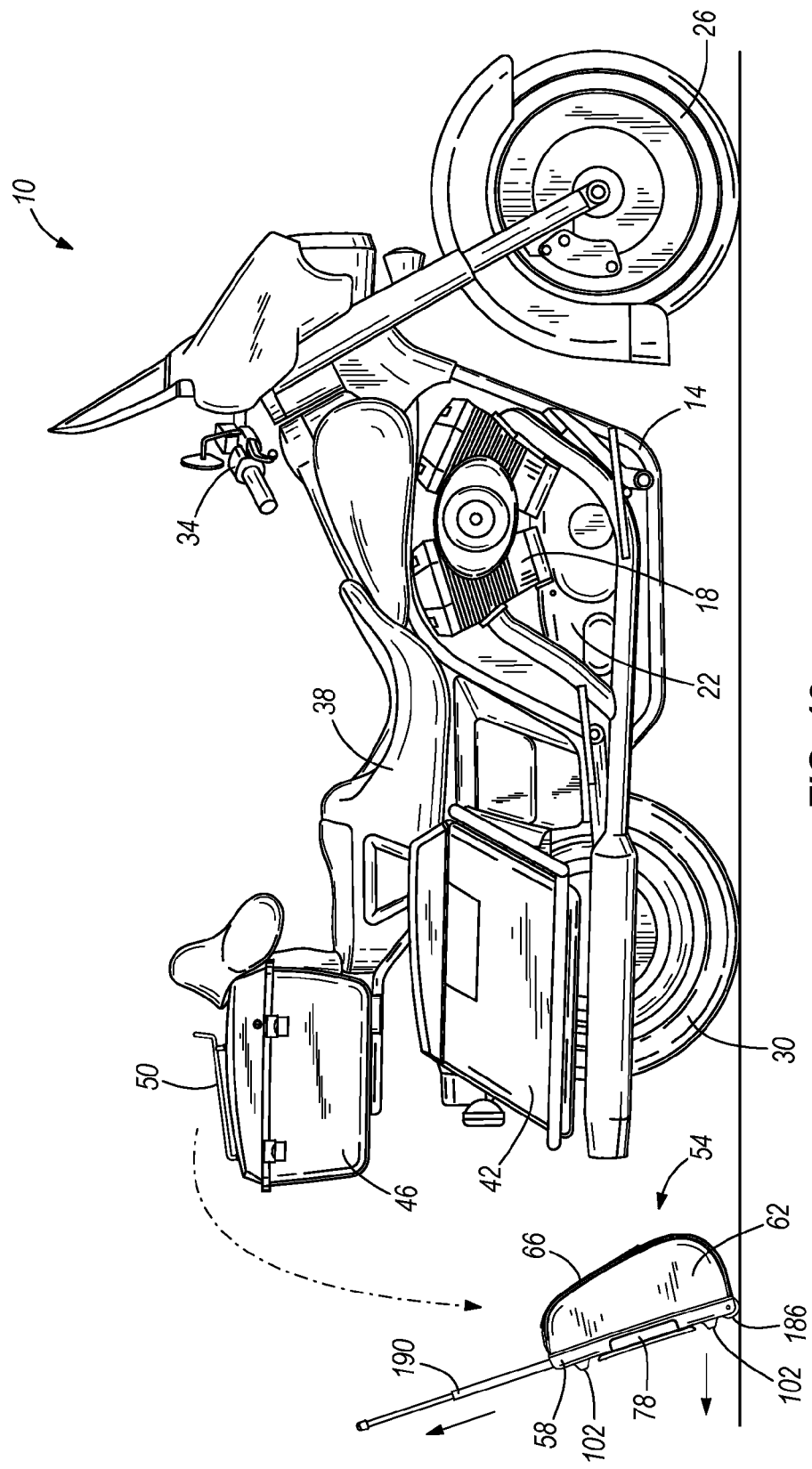
FIG. 13 is a side view of the motorcycle of FIG. 1 with another construction of the storage case in the detached position.

FIG. 13 shows another construction of the storage case 54 of the invention where the storage case 54 includes wheels 186 and an extendable handle 190. In this embodiment, when the storage case 54 is removed from the motorcycle 10, the extendable handle 190 may be extended and the user may tow the storage case 54 by the extendable handle 190 while the wheels 186 roll across the ground.

In another embodiment, the invention provides a method of attaching a storage case to a rack of a center-mounted luggage compartment of a motorcycle. The method includes moving a latch to an open position where access to a portion of a recess is provided, positioning a portion of the rack within the portion of the recess, moving the latch to a closed position after the portion of the rack has been positioned within the portion of the recess, inhibiting access to the portion of the recess when the latch is in the closed position, maintaining the portion of the rack within the portion of the recess when the latch is in the closed position, moving the latch to the open position after maintaining the portion of the rack within the portion of the recess, and removing the portion of the rack from the portion of the recess.

In some embodiments, the method further includes moving a second latch to an open position where access to a second portion of the recess is provided, moving the second latch to a closed position after a second portion of the rack has been positioned within the second portion of the recess, inhibiting access to the second portion of the recess when the second latch is in the closed position, maintaining the second portion of the rack within the second portion of the recess when the second latch is in the closed position, and moving the second latch to the open position after maintaining the second portion of the rack within the second portion of the recess.

Various features and advantages of the invention are set forth in the following claims.

What is claimed is:

1. A motorcycle comprising:
    a frame;
    an engine mounted to the frame;
    two wheels mounted for rotation to the frame, at least one of the wheels operably coupled to the engine;
    a rack coupled to the frame, the rack including a plurality of mounting posts and at least one engaging portion extending between the plurality of mounting posts; and
    a storage case including
        a body defining a cavity and an opening providing access to the cavity, the body including a base having a recess shaped to receive the at least one engaging portion of the rack, and
        a latch movably coupled to the base between an open position that provides access to the recess, and a closed position that inhibits access to the recess, the latch is coupled to the base only on a first side of the recess in the open position and is coupled to the base on both the first side and a second opposite side of the recess in the closed position, and an arm of the latch extends across the recess in the closed position,
    wherein the storage case is movable between an attached position where the at least one engaging portion of the rack is positioned within the recess and the latch is in the closed position, and a detached position where the latch is in the open position and the at least one engaging portion of the rack is positioned outside of the recess,
    wherein in the attached position of the storage case, the arm of the latch traps the at least one engaging portion of the rack within the recess and extends substantially between two adjacent ones of the plurality of mounting posts of the rack to secure the position of the storage case with respect to the rack,
    wherein the latch is a first latch, and the at least one engaging portion of the rack includes a first rack portion and a second rack portion, and wherein the recess includes a first recess portion shaped to receive the first rack portion and a second recess portion shaped to receive the second rack portion, wherein the storage case further includes a second latch movably coupled to the base between an open position that provides access to the second recess portion, and a closed position that inhibits access to the second recess portion, and wherein the first rack portion and the second rack portion are positioned within the first recess portion and the second recess portion and the first and second latches are in the closed positions when the storage case is in the attached position, and the first and second latches are in the open positions and the first rack portion and the second rack portion are positioned outside of the first recess portion and the second recess portion when the storage case is in the detached position, and
    wherein the base includes a forward portion, and wherein the rack includes a third rack portion the third rack portion connecting the first and second rack portions, and wherein the third rack portion is positioned adjacent the forward portion of the base when the storage case is in the attached position, and the forward portion of the base is spaced a greater distance from the third rack portion when the storage case is in the detached position.

2. The motorcycle of claim 1, further comprising a center-mounted luggage compartment coupled to the frame, the rack being attached to the top of the center-mounted luggage compartment.

3. The motorcycle of claim 1, wherein the first, second, and third rack portions define a U-shaped rack.

4. The motorcycle of claim 1, wherein the storage case further includes a securing element that engages the third rack portion and maintains the forward portion of the storage case adjacent to the third rack portion when the storage case is in the attached position.

5. The motorcycle of claim 1, wherein the storage case further includes at least one retainer that engages the latch to inhibit the latch from moving from the closed position to the open position, and inhibit the latch from moving from the open position to the closed position.

6. The motorcycle of claim 1, wherein the storage case further includes a handle coupled to at least one of the base and the body, and wheels rotatably coupled to at least one of the base and the body, wherein the handle is extendable.

7. The motorcycle of claim 1, wherein the storage case further includes a cover that selectively allows access to the cavity, and wherein the storage case further includes a flap positioned between the cavity and the cover, the flap selectively allowing access to the cavity and at least partially defining a storage space above the cavity between the flap and the cover.

8. The motorcycle of claim 1, wherein the latch is coupled to the base to slide linearly between the closed and open positions.

9. The motorcycle of claim 1, wherein the base is provided with a latch recess that receives the latch, and an outer surface of the latch is substantially flush with an outer surface of the base when the latch is in the closed position.

10. A storage case configured for coupling to a rack mounted on a motorcycle, the storage case including:
 a body defining a cavity and an opening providing access to the cavity, the body including a base having a recess configured to receive a portion of the rack;
 a latch movably coupled to the base between an open position that provides access to the recess, and a closed position that inhibits access to the recess, the latch is coupled to the base only on a first side of the recess in the open position and is coupled to the base on both the first side and a second opposite side of the recess in the closed position, and an arm of the latch extends across the recess in the closed position; and
 at least one retainer that engages the latch in the closed position to inhibit the latch from moving to the open position, and that engages the latch in the open position to inhibit the latch from moving to the closed position;
 wherein the storage case is movable between an attached position where the latch is in the closed position and configured to maintain the portion of the rack within the recess, and a detached position wherein the latch is in the open position and configured to allow the removal of the storage case from the rack.

11. The storage case of claim 10, wherein the recess includes a first recess portion configured to receive a first rack portion of the rack, and a second recess portion configured to receive a second rack portion, wherein the latch is a first latch and the storage case includes a second latch movably coupled to the base between an open position that provides access to the second recess portion, and a closed position that inhibits access to the second recess portion, and wherein the first and second recess portions are configured to receive the first and second rack portions and the first latch and the second latch are in the closed position when the storage case is in the attached position, and the first latch and second latch are in the open position and the first and second recess portions are configured to release the first and second rack portions when the storage case is in the detached position.

12. The storage case of claim 11, wherein the base includes a forward portion configured to receive a third rack portion that is disposed forward of the first and second rack portions, and wherein the forward portion of the base is configured to be adjacent the third rack portion when the storage case is in the attached position, and the forward portion of the base is configured to be separated from the third rack portion when the storage case is in the detached position.

13. The storage case of claim 12, further comprising a securing element configured to engage the third rack portion and maintain the forward portion of the storage case adjacent the third rack portion when the storage case is in the attached position.

14. The storage case of claim 10, further comprising a handle coupled to at least one of the base and the body, and wheels rotatably coupled to at least one of the base and the body, wherein the handle is extendable.

15. The storage case of claim 10, further including a cover that selectively allows access to the compartment, and a flap positioned between the cavity and the cover, the flap selectively allowing access to the cavity and at least partially defining a storage space above the cavity between the flap and the cover.

16. The storage case of claim 10, wherein the latch is coupled to the base to slide linearly between the closed and open positions.

17. The storage case of claim 10, wherein the base is provided with a latch recess that receives the latch, and an outer surface of the latch is substantially flush with an outer surface of the base when the latch is in the closed position.

18. A motorcycle comprising:
 a frame;
 an engine mounted to the frame;
 two wheels mounted for rotation to the frame, at least one of the wheels operably coupled to the engine;
 a rack coupled to the frame, the rack including a plurality of mounting posts and at least one engaging portion extending between the plurality of mounting posts; and
 a storage case including
  a body defining a cavity and an opening providing access to the cavity, the body including a base having a recess shaped to receive the at least one engaging portion of the rack, and
  a latch movably coupled to the base between an open position that provides access to the recess, and a closed position that inhibits access to the recess, the latch is coupled to the base only on a first side of the recess in the open position and is coupled to the base on both the first side and a second opposite side of the recess in the closed position, and an arm of the latch extends across the recess in the closed position,
  wherein the storage case is movable between an attached position where the at least one engaging portion of the rack is positioned within the recess and the latch is in the closed position, and a detached position where the latch is in the open position and the at least one engaging portion of the rack is positioned outside of the recess,
  wherein in the attached position of the storage case, the arm of the latch traps the at least one engaging portion of the rack within the recess and extends substantially between two adjacent ones of the plurality of mounting posts of the rack to secure the position of the storage case with respect to the rack, and
  wherein the storage case further includes at least one retainer that engages the latch to inhibit the latch from moving from the closed position to the open position, and inhibit the latch from moving from the open position to the closed position.

* * * * *